United States Patent
Sethi et al.

(10) Patent No.: US 10,779,230 B1
(45) Date of Patent: Sep. 15, 2020

(54) METHODS AND DEVICES FOR NETWORK SELECTION WITH STEERING OF ROAMING LIST

(71) Applicant: Intel Corporation, Santa Clara, CA (US)

(72) Inventors: Anuj Sethi, Nuremberg (DE); Harish Mitty, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/459,632

(22) Filed: Jul. 2, 2019

(51) Int. Cl.
| | |
|---|---|
| *H04W 48/18* | (2009.01) |
| *H04W 48/16* | (2009.01) |
| *H04W 48/02* | (2009.01) |
| *H04W 8/06* | (2009.01) |
| *H04W 60/04* | (2009.01) |
| *H04W 36/00* | (2009.01) |
| *H04W 36/14* | (2009.01) |
| *H04W 36/16* | (2009.01) |
| *H04W 8/08* | (2009.01) |

(52) U.S. Cl.
CPC .............. *H04W 48/18* (2013.01); *H04W 8/06* (2013.01); *H04W 8/08* (2013.01); *H04W 36/0061* (2013.01); *H04W 36/14* (2013.01); *H04W 36/16* (2013.01); *H04W 48/02* (2013.01); *H04W 48/16* (2013.01); *H04W 60/04* (2013.01)

(58) Field of Classification Search
CPC ... H04W 48/18; H04W 8/06; H04W 36/0061; H04W 48/02; H04W 60/04; H04W 36/16; H04W 36/14; H04W 8/08
See application file for complete search history.

(56) References Cited

U.S. PATENT DOCUMENTS

| | | | | |
|---|---|---|---|---|
| 8,391,857 | B2 * | 3/2013 | Catalano | H04W 48/18 |
| | | | | 455/422.1 |
| 10,143,029 | B2 * | 11/2018 | Behera | H04W 76/18 |
| 2010/0291924 | A1 * | 11/2010 | Antrim | H04W 60/00 |
| | | | | 455/433 |
| 2017/0223623 | A1 * | 8/2017 | Cao | H04W 48/02 |
| 2018/0007620 | A1 * | 1/2018 | Kim | H04W 48/18 |
| 2018/0070297 | A1 * | 3/2018 | Shu | H04W 48/18 |
| 2019/0166484 | A1 * | 5/2019 | Chauhan | H04W 8/12 |

OTHER PUBLICATIONS

3rd Generation Partnership Project (3GPP TM), 3GPP TS 23.122 vol. 16.1.0 3rd Generation Partnership Project, "Technical Specification Group Core Network and Terminals; Non-Access-Stratum (NAS) functions related to Mobile Station (MS) in idle mode (Release 16)", Annex C (normative): Control plane solution for steering of roaming in 5 GS, dated Mar. 2019, pp. 53-58.

* cited by examiner

*Primary Examiner* — Brandon J Miller
(74) *Attorney, Agent, or Firm* — Viering, Jentschura & Partner MBB

(57) ABSTRACT

A wireless device may include a digital receiver and a digital transmitter, and a controller configured to control the digital receiver to receive signals and the digital transmitter to transmit signals, and further configured to receive a registration rejection from a first roaming mobile network while roaming, add the first roaming mobile network to a list of forbidden mobile networks, register with a second roaming mobile network and receiving an operator list of mobile networks from a home mobile network, and attempt to register with the first roaming mobile network based on a ranking of mobile networks in the operator list.

20 Claims, 7 Drawing Sheets

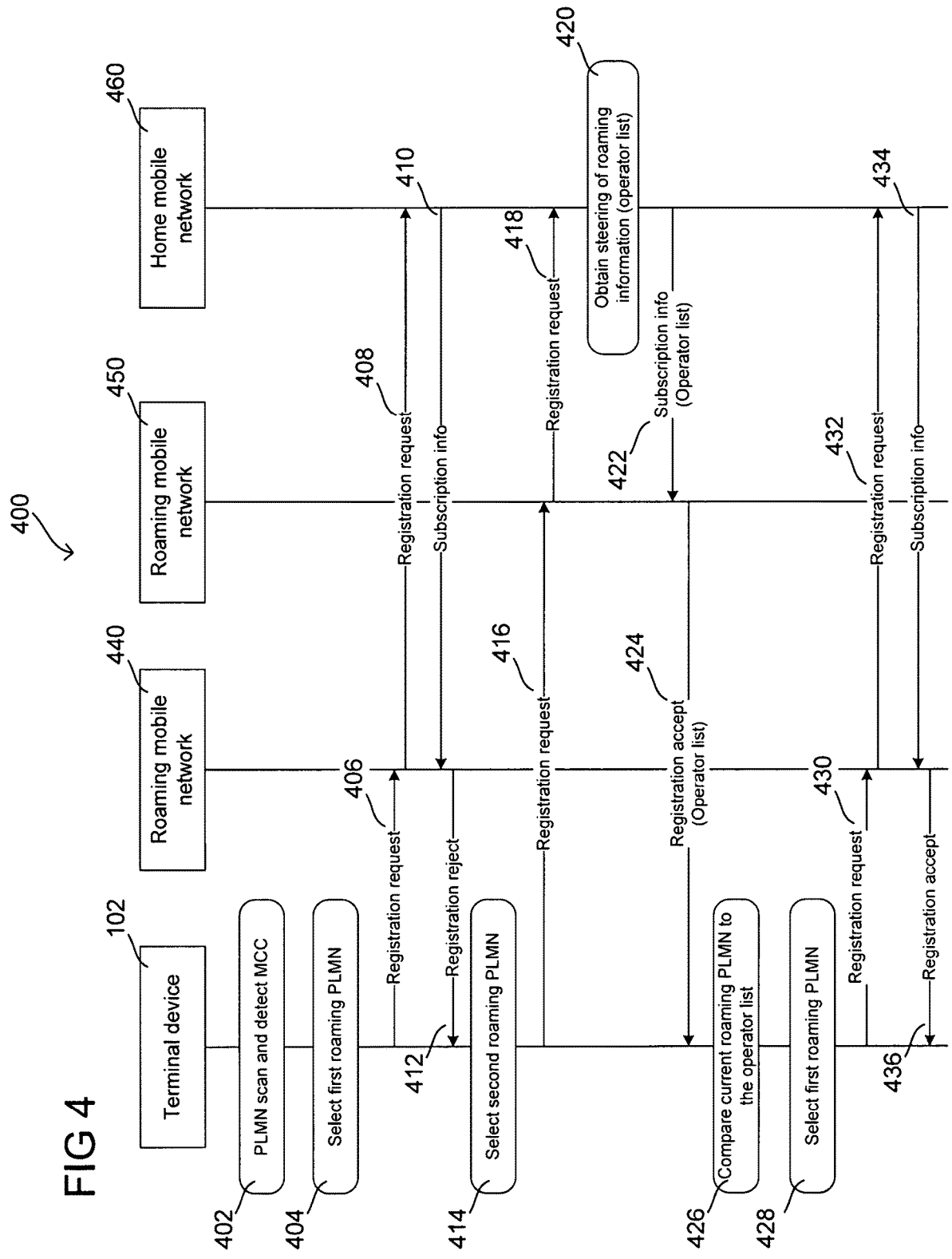

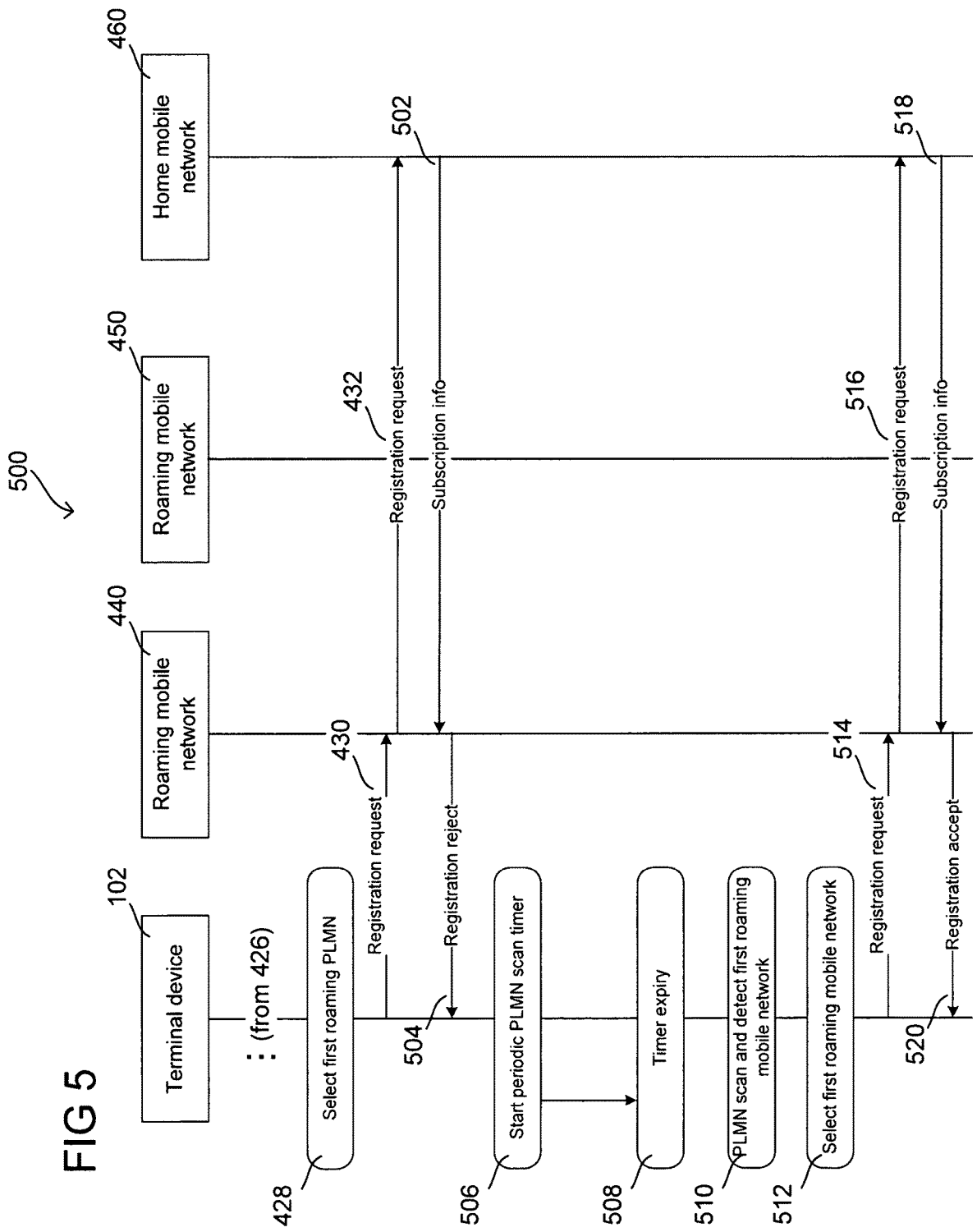

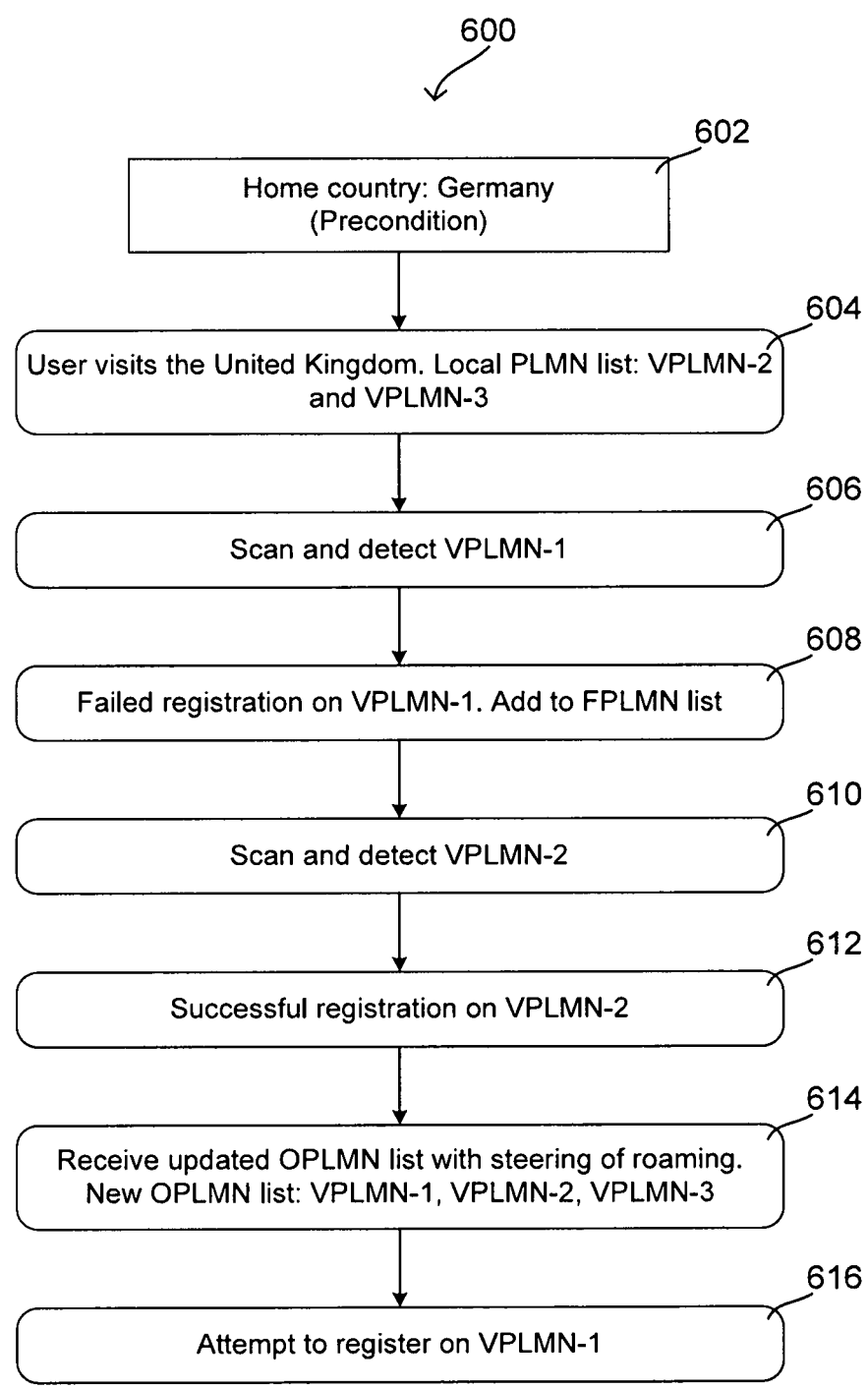

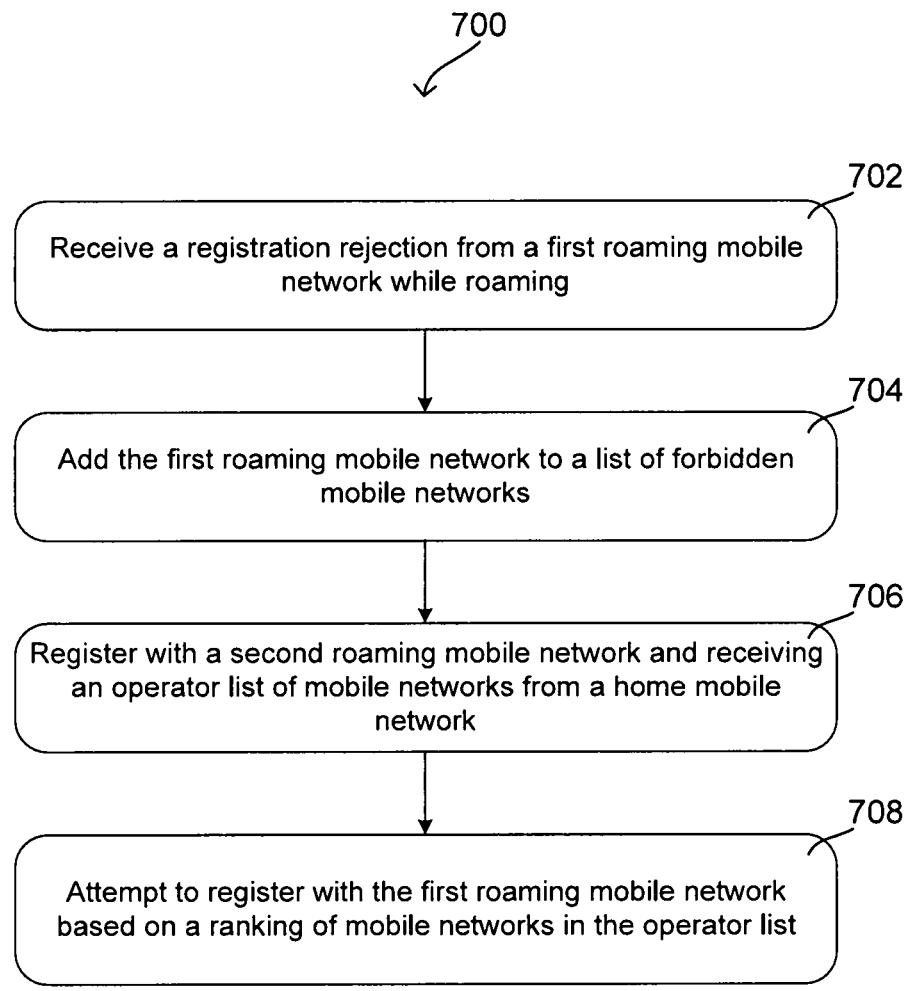

US 10,779,230 B1

METHODS AND DEVICES FOR NETWORK SELECTION WITH STEERING OF ROAMING LIST

TECHNICAL FIELD

Various embodiments relate generally to methods and devices for network selection with steering of roaming list.

BACKGROUND

When traveling outside of their home mobile network's coverage area, many terminal devices use roaming to connect to and register with a roaming mobile network. Once the terminal device is registered, it may use the roaming mobile network to perform standard operations like establishing data connections and making voice calls. This can be particularly advantageous, for example, when users travel to foreign countries and use their terminal devices for international roaming.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows an exemplary message sequence chart where a terminal device overrules a forbidden list when selecting a roaming mobile network according to some aspects;

FIG. 5 shows an exemplary message sequence chart where a terminal device overrules a forbidden list after a periodic mobile network scan according to some aspects;

FIG. 6 shows an exemplary flow chart for a use case where a user uses a terminal device for international roaming according to some aspects; and FIG. 7 shows an exemplary method of performing wireless communications at a wireless device according to some aspects.

DESCRIPTION

Figure 1:
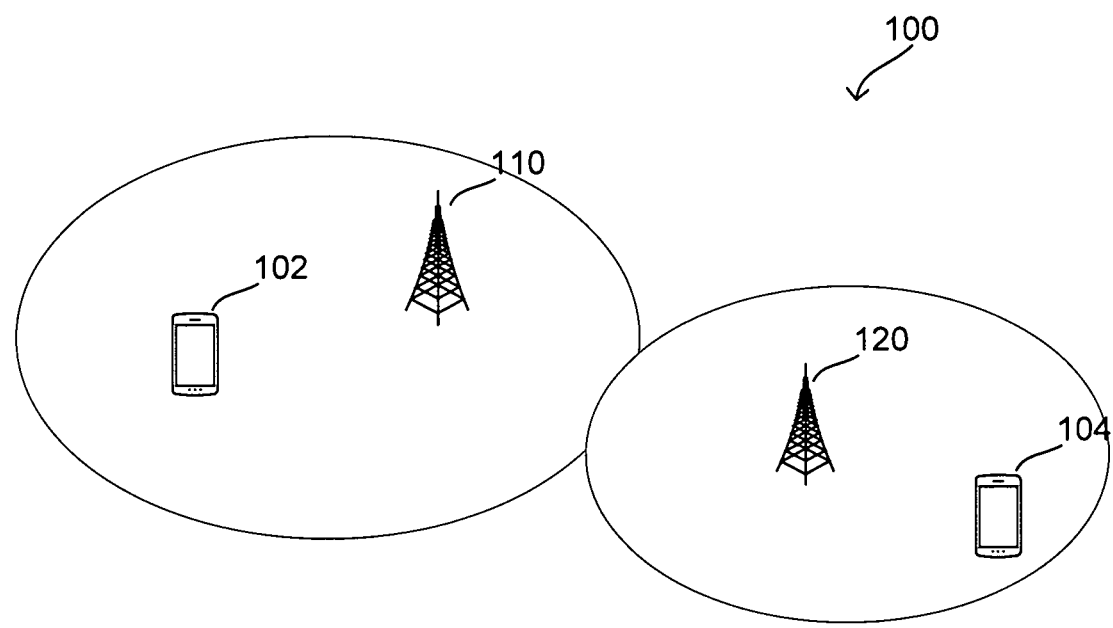
FIG. 1 shows an exemplary radio communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Various aspects of this disclosure are directed to methods and devices that, when roaming, attempt to register on forbidden mobile networks based on an operator list provided by their home mobile network. When a terminal device registers on a roaming mobile network, the terminal device's home mobile network can send it an operator list of mobile networks that ranks mobile networks by priority. If a mobile network on the operator list has higher priority than the current roaming mobile network, the terminal device may abort the current registration and attempt to register on the higher priority mobile network. With these techniques, the terminal device may attempt registration on the higher priority mobile network, even if that mobile network was previously put on the forbidden list because of a rejected registration. The terminal device may therefore avoid scenarios where it mistakenly puts a high priority mobile network on the forbidden list and ultimately never attempts to register on it.

Figure 2:
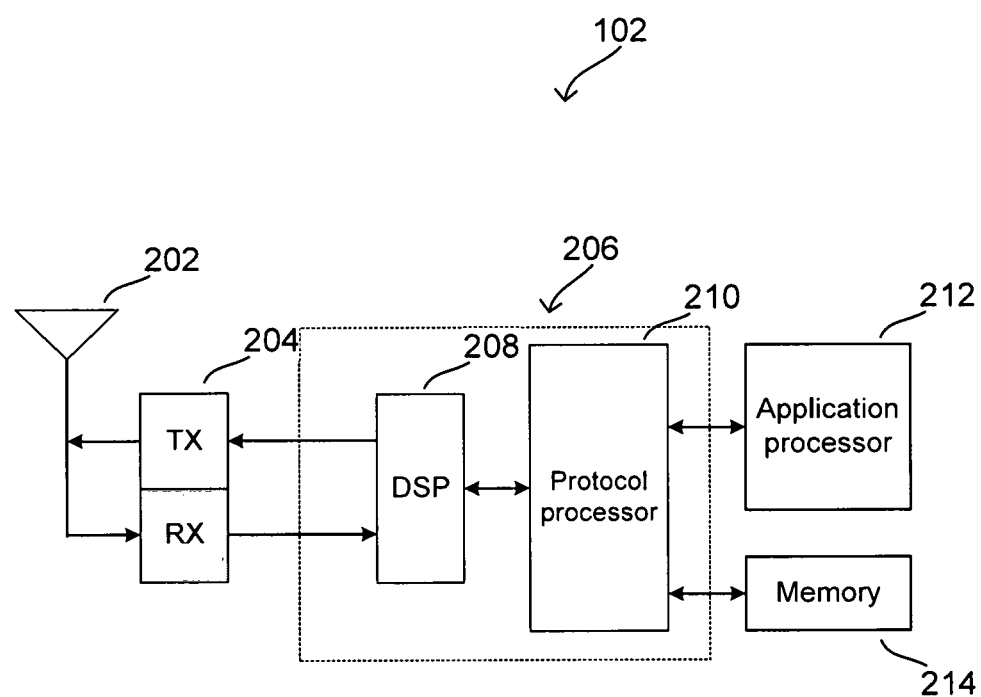
FIG. 2 shows an exemplary internal configuration of a terminal device according to some aspects.

FIGS. 1 and 2 depict an exemplary network and device architecture for wireless communications. Starting with FIG. 1, FIG. 1 shows exemplary radio communication network 100 according to some aspects. Radio communication network 100 may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mm Wave, etc.), these examples may incorporate any other type or configuration of radio access network.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network, such as an Evolved Packet Core (EPC, for LTE), $5^{th}$ Generation Core (5GC, for 5G NR), or another type of cellular core network. The cellular core network may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 may therefore provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104. The core network may also provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Terminal devices 102 and 104 and network access nodes 110 and 120 may therefore follow the defined communication protocols to transmit and receive data over the radio access network of radio communication network 100. The core network may follow the defined communication protocols to route data within and outside of the core network. Exemplary communication protocols include LTE, UMTS, GSM, WiMAX, Bluetooth, WiFi, mm Wave, etc., any of which may be applicable to radio communication network 100.

FIG. 2 shows an internal configuration of terminal device 102 according to some aspects. As shown in FIG. 2, terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct this communication functionality of terminal device 102 according to the communication protocols associated with each radio access network. Baseband modem 206 may thus control antenna system 202 and RF transceiver 204 to transmit and receive radio signals according to the formatting and scheduling parameters for the communication protocols. In some aspects where terminal device 102 is configured to operate on multiple radio communication technologies, terminal device 102 may include separate communication components for each supported radio communication technology (e.g., a separate antenna, RF transceiver, digital signal processor, and controller).

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) for baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), with which RF transceiver 204 may convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals for antenna system 202 to wirelessly transmit. RF transceiver 204 may include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204. This may include specifying the radio frequencies RF transceiver 204 to transmit or receive on.

As shown in FIG. 2, baseband modem 206 may include digital signal processor 208, which may perform physical layer (PHY; Layer 1) transmission and reception processing. In the transmit path, digital signal processor 208 may prepare outgoing transmit data (from protocol controller 210) for transmission via RF transceiver 204. In the receive path, digital signal processor 208 may prepare incoming received data (from RF transceiver 204) for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions. The one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) according to the communication protocols of each supported radio communication technology. In some aspects, protocol controller 210 may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals according to the protocol stack control logic in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to transfer application layer data to and from radio terminal device 102 with the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU configured to handle the layers above the protocol stack, including the transport and application layers. Application processor 212 may be configured to execute various applications and/or programs of terminal device 102 at an application layer of terminal device 102. These applications and/or programs may include an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

Various aspects of this disclosure are directed to terminal device behavior when selecting a roaming network. When a user travels to a foreign country, their terminal device may use roaming to connect to and operate on foreign mobile networks After the user first arrives and activates their terminal device, the device often performs a network scan to determine which country the user is in. The terminal device then selects a mobile network to use as a roaming mobile network (visited public land mobile network (VPLMN)) and attempts to register on that roaming mobile network.

If the terminal device successfully registers, it can then use the roaming mobile network as it would its home mobile network, such as to make calls and access the Internet. However, if the initial registration fails, the terminal device may add the failed roaming mobile network to a list of forbidden mobile networks (forbidden list). That list of forbidden mobile networks may be maintained locally at the terminal device, such as on the terminal device's subscriber identity module (SIM) card. Additionally or alternatively, a terminal device may use cloud-based storage to store the list, and may retrieve the list from the cloud on-demand. After adding the failed roaming mobile network to the forbidden list, the terminal device may attempt to register on another roaming mobile network. Because the failed roaming mobile network is on the forbidden list, the terminal device will not re-attempt to register on it for an extended period of time (e.g., after a long duration timer expires, after the user restarts the terminal device, or when the user manually selects the failed roaming mobile network). These forbidden lists can help prevent failed registration attempts on the same roaming mobile network. For example, the roaming mobile network may not have a roaming agreement in place with the terminal device's home mobile network. In that case, it may be a waste of time and power for the terminal device to repeatedly attempt to register on that roaming mobile network.

However, while forbidden lists can prevent multiple failed registration attempts, they can also cause problems. For instance, a user may initially forget to enable international roaming on their terminal device when they first arrive in another country. When their terminal device attempts to register with a roaming mobile network, their home mobile network may inform the roaming mobile network that international roaming is not permitted. The roaming mobile network may then reject the registration request, and the terminal device may add the roaming mobile network to the forbidden list. Unless the user manually selects that roaming mobile network or restarts the terminal device, the terminal device will not re-attempt to register on that network until a long duration timer expires (e.g., 18 hours in 3GPP).

While this behavior can be useful when the registration rejection cause is permanent, it can be harmful when the rejection cause is only temporary, such as when the user merely forgot to enable international roaming. Because the roaming mobile network is now on the forbidden list, the terminal device will not retry to register on it, even if the user later activates international roaming. Thus, even though the terminal device could now register on the roaming network, the terminal device would never try.

Accordingly, aspects of this disclosure provide methods and devices for triggering registration attempts on high priority mobile networks even when those networks are on the forbidden list. In some aspects, terminal devices may identify these high priority mobile networks using an operator list provided by the home mobile network through steering of roaming. Steering of roaming is a new feature exemplified in the 3GPP's Fifth Generation (5G) New Radio (NR) standard (3GPP TS 23.222 Annex C, "Control plane solution for steering of roaming in 5GS"). When a home mobile network uses steering of roaming, it sends the terminal device an operator list of mobile networks when the terminal device registers with a roaming mobile network. Various mobile networks may be ranked based on priority and/or hierarchy. This ranking may be stored on this operator list. For instance, the home mobile network may rank some mobile networks as higher priority for roaming than others or with a higher hierarchy based on less interference. After the terminal device receives the operator list, it can check whether any other mobile networks are ranked higher on the operator list than the current roaming network. If so, the terminal device may abort the registration on the current roaming network and attempt to register on another mobile network with higher priority. By using the operator list with steering of roaming, the home mobile network may be able to dynamically inform the terminal device which roaming networks have the highest priority.

Aspects of this disclosure may therefore use this operator list to identify high priority mobile networks. If a high priority mobile network is on the forbidden list, the terminal device may overrule the forbidden designation and re-attempt to register on the high priority mobile network. If the issue that caused an earlier registration failure on that network has been resolved (like when the user enables international roaming), this registration attempt may be successful. The terminal device may thus register on and roam on the higher-priority mobile network. As a result, these aspects can improve performance for international roaming, reduce the amount of time to camp on the highest priority (preferred) roaming mobile network, and improve user experience.

Figure 3:
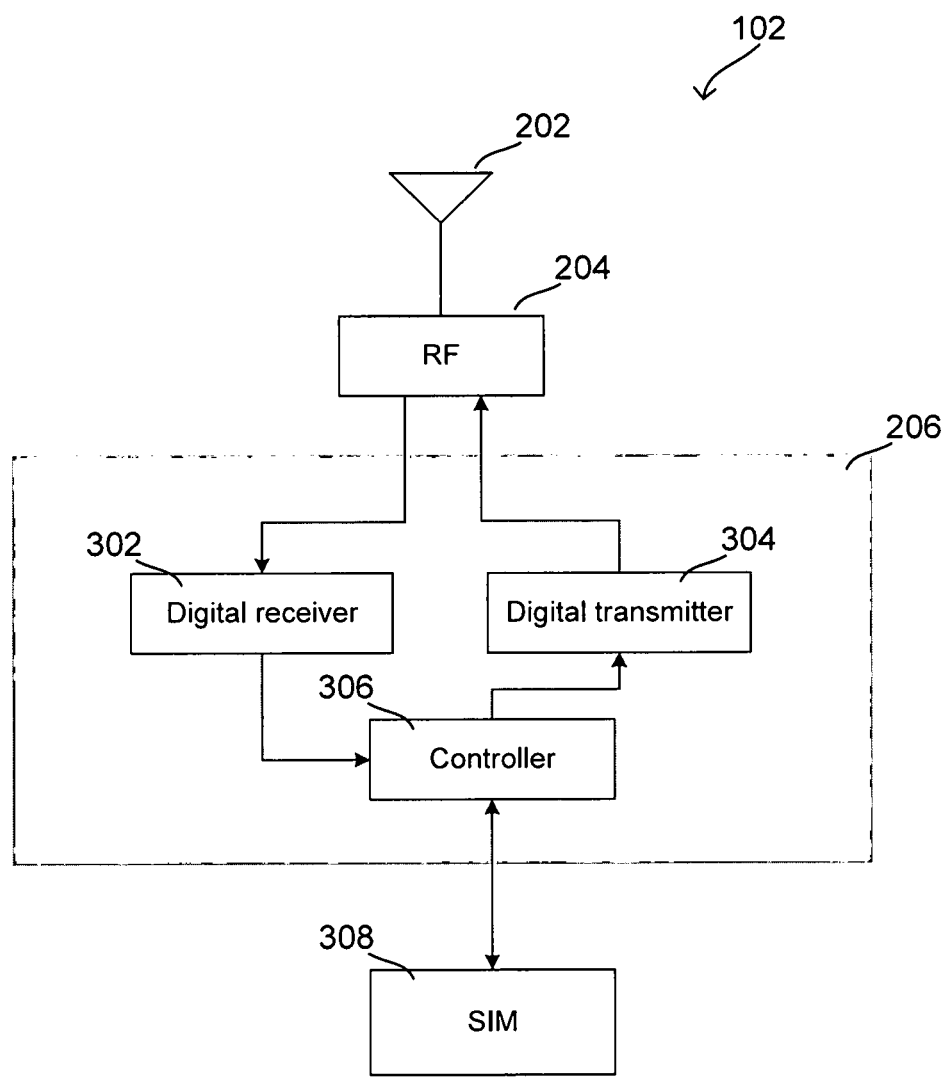
FIG. 3 shows an exemplary internal configuration of a terminal device configured to perform network selection based on an operator list according to some aspects.

This disclosure will first introduce an exemplary structural configuration of a terminal device, followed by an exemplary description of its roaming network selection behavior. FIG. 3 shows an exemplary internal configuration of terminal device 102 according to some aspects. While this depiction includes many of the same subcomponents of FIG. 2, FIG. 3's depiction is focused on terminal device 102's behavior when it selects roaming mobile networks. FIG. 3 may therefore omit other subcomponents that are less directly related to those capabilities.

As shown in FIG. 3, terminal device 102 may include antenna system 202, RF transceiver 204, baseband modem 206, which may be configured in the manner described above for terminal device 102 in FIG. 2. Accordingly, baseband modem 206 may direct the communication functionality of terminal device 102 according to the communication protocols for each radio access network, and may control antenna array 202 and RF transceiver 204 to transmit and receive radio signals according to the formatting and scheduling parameters defined by each communication protocol.

FIG. 3 also depicts several internal components of baseband modem 206, including digital receiver 302, digital transmitter 304, and controller 306. In some aspects, baseband modem 206 may include a digital signal processor and a protocol controller (e.g., such as in FIG. 2). Digital receiver 302, digital transmitter 304, and controller 306 may therefore be subcomponents of the digital signal processor (e.g., physical layer components) and/or subcomponents of the protocol controller (e.g., protocol stack components). In some aspects, digital receiver 302 may be the physical layer receive chain, digital transmitter 304 may be the physical layer transmit chain, and controller 306 may be the protocol controller that executes the protocol stack of baseband modem 206. For example, digital receiver 302 may include a demodulator, demapper (e.g., constellation demapper), de-interleaver, decoder, and/or descrambler. Digital receiver 302 may receive wireless signals in the form of baseband samples via antenna array 202 and RF transceiver 204. Digital receiver 302 may then sequentially process these baseband samples with the demodulator, demapper (e.g., constellation demapper), de-interleaver, decoder, and/or descrambler to produce a bitstream, which digital receiver 302 may provide to controller 306 (e.g., to protocol stack layers of controller 306). Digital transmitter 304 may include a scrambler, encoder, interleaver, mapper (e.g., constellation mapper), and/or a modulator, which may sequentially process a bitstream (e.g., provided by protocol stack layers of controller 306) to produce baseband samples (e.g., complex IQ symbols). Digital transmitter 304 may then transmit these baseband samples as wireless signals via RF transceiver 204 and antenna array 202.

Controller 306 may include one or more processors configured to execute the protocol stack layers as software. This may include generating messages for digital transmitter 304 to transmit (e.g., messages including user or control data) and/or recovering messages from bitstreams provided by digital receiver 302. In some aspects, controller 306 may be configured to perform user-plane and control-plane functions to facilitate the transfer of application layer data to and from terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 306 may include executable instructions that define the logic of these functions. In some aspects, controller 306 may also be configured to perform physical layer control features and may instruct digital receiver 302 and digital transmitter 306 to perform various physical layer processing operations.

Terminal device 102 may also include SIM 308. SIM 308 may be a SIM card storing subscriber information for terminal device 102. This subscriber information may include information identifying a home mobile network (e.g., HPLMN) of terminal device 102 and a list of mobile networks. The list of mobile networks may be a ranked list that ranks various mobile networks by priority. The list of mobile networks may be configured and/or modified by a user or a mobile network operator (MNO). Controller 306 may be configured to update the list of mobile networks, including, for example, by adding or removing mobile networks from a forbidden list of mobile networks.

As introduced above, terminal device 102 may be configured to perform PLMN selection by attempting registration on certain forbidden mobile networks based on an operator list of mobile networks. Terminal device 102's home mobile network may provide this operator list when terminal device 102 registers on a roaming mobile network. FIG. 4 shows exemplary message sequence chart 400 that illustrates this procedure according to some aspects. As shown in FIG. 4, terminal device 102 may perform the procedure of message sequence chart 400 with mobile networks 440, 450, and 460. Mobile networks 440 and 450 may be roaming mobile networks (e.g., VPLMNs) while mobile network 460 may be the home mobile network (e.g., HPLMN) for terminal device 102.

Terminal device 102 may first perform a mobile network scan and detect the country code in stage 402. In some cases, terminal device 102 may perform stage 402 after it powers on, or after a user disables airplane mode. Because terminal device 102 is not initially registered on a mobile network, terminal device 102 may perform stage 402 to detect the available mobile networks and to determine which country terminal device 102 is located in (e.g., when the user travels to a foreign country with terminal device 102).

In some aspects, digital receiver 302 may perform stage 402, such as where controller 306 instructs digital receiver 302 to perform a mobile network scan. Digital receiver 302 may perform stage 402 in different manners. In a first option, digital receiver 302 may scan through different carrier frequencies with RF transceiver 204 and receive a signal on each carrier frequency (via RF transceiver 204 and antenna system 202). Digital receiver 302 may then detect the strongest cell on each scanned carrier frequency (e.g., with a cross-correlation-based cell search technique) and receive a system information message (e.g., a Master Information Block (MIB)) from that strongest cell. Digital receiver 302 may read from the system information message the network ID (e.g., PLMN ID) as well as the country code (e.g., mobile country code (MCC)). The network ID is a unique identity that identifies which mobile network is operating the cell and the country code is a code that which country the cell is operating in. Digital receiver 302 may then report back to controller 306 a list of detected mobile networks as well as the country code.

In a second option of stage 402, digital receiver 302 may first perform a short RF scan to determine the location of terminal device 102 and may then select mobile network search sequence based on the location. For example, digital receiver 302 may scan carrier frequencies until digital receiver 302 detects a cell. Digital receiver 302 may then receive a system information message from that cell to determine the country code. Digital receiver 302 may report the country code back to controller 306, which may then determine a unique mobile network search sequence for that country. Controller 306 may instruct digital receiver 302 to scan for mobile networks using that mobile network search sequence. Based on the mobile network search sequence, digital receiver 302 may scan across multiple carrier frequencies to detect and receive system information from cells. Digital receiver 302 may identify which mobile networks operate the active cells and report the list of mobile networks back to controller 306.

Thus, following stage 402, controller 306 may have a list of which mobile networks are active on various carrier frequencies. In this exemplary scenario, terminal device 102 may be roaming and may not have service from its home mobile network. Because terminal device 102 is roaming, controller 306 may select a first roaming mobile network in stage 404. For example, controller 306 may access a list of mobile networks in SIM 308 that ranks mobile networks based on their priority when roaming. The list may therefore indicate a particular mobile network as the highest-priority mobile network, which means that, when roaming, terminal device 102 should always attempt to find and register with this highest-priority mobile network. The list may also rank a second highest-priority mobile network, third highest-priority mobile network, and so on.

Controller 306 may therefore determine which detected mobile network (from the mobile network scan in stage 402) has the highest priority in the list. In the example of FIG. 4, roaming mobile network 440 may be the detected mobile network with the highest priority in the list. Controller 306 may therefore select roaming mobile network 440 as a first roaming mobile network in stage 404.

Terminal device 102 may then attempt to register on roaming mobile network 440 in stage 406. For instance, controller 306 may connect to a cell of roaming mobile network 440 (e.g., with a random access procedure), generate a registration request, and instruct digital transmitter 304 to transmit it (via RF transceiver 204 and antenna system 202) to roaming mobile network 440 (e.g., to an Access and Mobility Management function (AMF) of the 5GC of roaming mobile network 440). By sending the registration request, terminal device 102 may attempt to register on roaming mobile network 440 for roaming.

The registration request may identify home mobile network 460 as the home mobile network of terminal device 102. Roaming mobile network 440 may therefore determine whether to accept or reject the registration request. In some cases, roaming mobile network 440 may reject terminal device 102's registration request without querying home mobile network 460. In other cases, like that shown in FIG. 4, roaming mobile network 440 may query home mobile network 460 (e.g., a Unified Data Management (UDM) of the 5GC of home mobile network 460) in stage 408 to determine whether to accept or reject the registration request. This can include where mobile roaming mobile network 440 requests from home mobile network 460 the subscription information for terminal device 102 (e.g., Access and Mobility Subscription data for terminal device 102).

Home mobile network 460 may respond with subscription information for terminal device 102. Roaming mobile network 440 may then decide whether to accept or reject the roaming request based on the status and subscription information. In this exemplary case, roaming mobile network 404 may decide to reject the registration request. As further explained below, this can happen for different reasons. After deciding to reject the registration request, roaming mobile network 440 may send a registration rejection to terminal device 102 in stage 412.

Controller 306 may receive the registration rejection and determine that registration on roaming mobile network 440 has failed. As a result, controller 306 may add roaming mobile network 440 to a forbidden list of mobile networks. For example, controller 306 may access the list of mobile networks on SIM 308 and may add roaming mobile network 440 to the forbidden list. Controller 306 may, to take one example, modify the list data stored on SIM 308 so that it identifies roaming mobile network 440 as a forbidden mobile network.

Roaming mobile network 440 may decide to reject the registration request for different reasons. For instance, home mobile network 460 may not have a roaming agreement with roaming mobile network 440, and so may not permit terminal device 102 to roam on roaming mobile network 440. In this case, home mobile network 460 may provide subscription information to roaming mobile network 440 which indicates that there is not a roaming agreement between the networks. Since there is no roaming agreement, roaming mobile network 440 may reject the registration request. In another example, the user of terminal device 102 may not have enabled roaming. For instance, the user may have forgotten to turn on roaming for terminal device 102 when they arrived in a foreign country. As a result, terminal device 102 will get rejected from every roaming mobile network on which it tries to register. Roaming mobile network 440 may determine this based on the subscription information from home mobile network 460 in stage 412.

Because the initial registration attempt failed, controller 306 may select a second roaming mobile network to try to register on. In FIG. 4's example, controller 306 may select roaming mobile network 450 as the second roaming mobile network, such as where controller 306 determines that roaming mobile network 450 has the highest priority (in the list) of any of the mobile networks detected in stage 402.

After selecting roaming mobile network 450, controller 306 may send a registration request to roaming mobile network 450 in stage 416. Controller 306 may, in one example, transmit the registration request to an AMF in the 5GC of roaming mobile network 450. Roaming mobile network 450 may then determine whether to reject or accept the registration request. As FIG. 4 shows, roaming mobile network 450 may query home mobile network 460 in stage 418, such as where the AMF in roaming mobile network 450 contacts a UDM in home mobile network 460 to retrieve subscriber information for terminal device 102.

In FIG. 4's example, home mobile network 460 may permit terminal device 102 to roam on roaming mobile network 450. Home mobile network 460 may thus provide subscriber information to roaming mobile network 450 in stage 422 indicates that terminal device 102 can roam on roaming mobile network 450. As shown in FIG. 4, home mobile network 460 may also obtain steering of roaming information that includes an operator list of mobile networks. This operator list of mobile networks may rank mobile networks by priority. In some aspects, home mobile network 460 may tailor the operator list based on specific operator policies, such as by generating the operator list based on the current roaming mobile network (e.g., roaming mobile network 450) or the location of terminal device 102 (e.g., which country terminal device 102 is in).

Home mobile network 460 may send both the subscriber information and the operator list to roaming mobile network 450 in stage 422. In some aspects, home mobile network 460 may send the subscriber information with the operator list; in other aspects, home mobile network 460 may send the operator list in a separate message.

Roaming mobile network 450 may receive the subscriber information from home mobile network 460 and, based on that, decide to accept terminal device 102's registration request. Roaming mobile network 450 may then send a registration accept to terminal device 102 in stage 424. Roaming mobile network 450 may also forward terminal device 102 the operator list, either with the registration accept or as a separate message.

Controller 306 may receive the registration accept in stage 424 along with the operator list. In some aspects, controller 306 may respond to roaming mobile network 450 with a registration complete message (not explicitly shown in FIG. 4). Then, in stage 426, controller 306 may compare the current roaming mobile network, roaming mobile network 450, to the operator list. For instance, controller 306 may determine whether the operator list ranks any mobile networks with higher priority than roaming mobile network 450.

If controller 306 determines that roaming mobile network 450 is the highest-ranked mobile network in the operator list, controller 306 may stay registered on roaming mobile network 450. If not, controller 306 may determine that another mobile network is ranked with the highest priority in the operator list. Controller 306 may then attempt to register on that highest-ranked mobile network. In some aspects, controller 306 may abort the registration with roaming mobile network 450 and then attempt to register on the highest-ranked mobile network. For instance, controller 306 may trigger a detach procedure to detach from roaming mobile network 450, and may then attempt to register on the highest-ranked mobile network. In other aspects, controller 306 may attempt to register on the highest-ranked mobile network while still registered on roaming mobile network 450.

In FIG. 4's example, the operator list may rank roaming mobile network 440 as the highest-ranked mobile network. Even though controller 306 previously put roaming network 440 on the forbidden list, controller 306 may re-attempt to register on roaming mobile network 440. In other words, controller 306 may ignore that roaming network 440 is on the forbidden list and may attempt to register on it anyway.

Thus, controller 306 may determine in stage 428 that roaming mobile network 450 is the highest-ranked mobile network in the operator list. Controller 306 may then transmit another registration request to roaming mobile network 440 in stage 430. Although roaming mobile network 440 rejected the initial registration request in stage 412, conditions may have changed in the interim. For example, although roaming mobile network 440 may have rejected the initial registration request because the user of terminal device 102 had not yet enabled roaming, the user may have since enabled roaming (e.g., between stages 412 and 430). Since the roaming issue is now resolved, roaming network 440 may accept the registration request in stage 430. Specifically, as FIG. 4 shows, roaming mobile network 440 may transmit a registration request to home mobile network 460 in stage 432, and home mobile network 460 may respond in stage 434 by transmitting includes terminal device 102's subscriber information. This subscriber information may now indicate that terminal device 102 can roam on roaming mobile network 440. Roaming mobile network 440 may then accept terminal device 102's registration by sending a registration accept in stage 436.

Thus, by using the operator list to overrule the forbidden list, terminal device 102 may roam on the mobile network that the operator considers the highest priority (e.g., the preferred VPLMN). This can provide multiple benefits. For example, the highest-ranked mobile network may provide the highest performance (e.g., in terms of operator-specified key performance indicators (KPIs), thus improving terminal device 102's performance. This may in turn improve user experience. Additionally, some lower-ranked mobile networks may have higher roaming costs, meaning this technique can reduce user service billing. Moreover, because terminal device 102 can immediately attempt to register on the highest-ranked network, terminal device 102 can reduce the time it takes to camp on the best network.

FIG. 4 illustrates one exemplary scenario where terminal device 102 may overrule the forbidden list and re-attempt to register on roaming mobile network 440 even when it is forbidden. Terminal device 102 may also do this in other scenarios. For instance, the operator list provided by home mobile network 460 may rank a third roaming mobile network with the highest priority and may rank roaming mobile network 440 higher than roaming mobile network 450. Thus, when controller 306 compares the current roaming network (roaming network 450) to the operator list in stage 426, controller 306 may determine that the operator list ranks the third roaming mobile network with the highest priority. Controller 306 may then attempt to register on the third roaming mobile network. However, in this alternative example, controller 306 may not be able to register on the third roaming mobile network. This may happen, for instance, because the third roaming mobile network rejects terminal device 102's registration request, because digital receiver 302 did not detect the third roaming mobile network during the mobile network scan in stage 402, or because digital receiver 302 performs another mobile network scan and does not detect the third roaming mobile network. Since the highest priority mobile network (the third roaming mobile network) is not available, controller 306 may determine whether any other roaming mobile networks are ranked higher in the operator list than the current roaming mobile network. Controller 306 may determine that roaming mobile network 440 is ranked higher in the operator list, and so may attempt to register on roaming mobile network 440. Even though controller 306 added roaming mobile network 440 to the forbidden list in stage 412, controller 306 may overrule the forbidden list and re-attempt to register on roaming mobile network 440 (e.g., using the same procedure of stages 428-436). Because roaming mobile network 440 is ranked higher than the current roaming mobile network, terminal device 102 may improve performance if this second registration attempt is successful.

In some aspects, terminal device 102 may be configured to attempt registration on a particular forbidden mobile network only a single time (put differently, a single registration attempt after the mobile network is added to the forbidden list). For instance, if roaming mobile network 440 rejects controller 306's registration request in stage 436, controller 306 may keep roaming mobile network 440 on the forbidden list. Controller 306 may not attempt to register on roaming mobile network 440 until the forbidden list is reset (either by a long duration timer or by device restart) or until the user manually selects roaming mobile network 440 (e.g., by triggering manual mobile network selection on the operating system of terminal device 102).

In other aspects, terminal device 102 may be configured to reattempt registration on a forbidden mobile network more than once after it is initially forbidden. For instance, FIG. 5 shows an alternative version of FIG. 4 where terminal device 102 may make another registration attempt on roaming mobile network 440 after a periodic mobile network scan timer expires.

As message sequence chart 500 shows, stages 402-432 may be the same as in FIG. 4. However, roaming mobile network 440 may reject terminal device 102's registration request in stages 502-504 (instead of accepting the registration request as in message sequence chart 400). This can happen, for example, because the user still has not enabled roaming on terminal device 102. Because roaming mobile network 440 again rejected the registration request, terminal device 102 may stay registered on roaming mobile network 450 (e.g., by re-registering on roaming mobile network 450 after being rejected again from roaming mobile network 440 in stage 504, or where terminal device 102 can stay registered on one mobile network while attempting to register on another). In some aspects, terminal device 102 may be configured to periodically scan for the higher priority mobile networks when it is not registered on the highest priority mobile network. For instance, the operator list may rank roaming mobile network 440 as the highest priority mobile network. Since terminal device 102 is not registered on the highest priority mobile network, it may periodically trigger a mobile network scan to check whether the highest mobile network is available.

In FIG. 5's example, terminal device 102 may be configured to re-attempt to register on roaming mobile network 440 one more time after the next periodic mobile network scan. Thus, after being rejected from roaming mobile network 440 in stage 504, controller 306 may start a periodic mobile network scan timer in stage 506 (e.g., a 6-minute timer as in 5G NR). After the periodic mobile network scan timer expires, controller 306 may trigger a mobile network scan at digital receiver 302 in stage 510. Digital receiver 302 may scan over a plurality of carrier frequencies, identify the strongest cell on each, and read the mobile network identity for each strongest cell. After aggregating these pairs of carrier frequency and mobile network identity into a list of results, digital receiver 302 may report the results back to controller 306.

Controller 306 may then determine whether any of the detected mobile networks (in the list of results) are ranked higher than the current roaming mobile network (roaming mobile network 450) in the operator list. Controller 306 may, in stage 512, determine that roaming mobile network 440 was detected in the mobile network scan. Roaming mobile network 440 may still be on the forbidden list due to its previous rejections of terminal device 102 in stages 412 and 504. However, because controller 306 is configured to re-attempt registration on roaming mobile network 440 one additional time after the periodic mobile network scan, controller 306 may decide to reattempt registration on roaming mobile network 440 because it is ranked higher than roaming mobile network 450 in stage 512.

Controller 512 may then attempt another registration on roaming mobile network 440 in stage 514 by sending a registration request to roaming mobile network 440. Roaming mobile network 440 may then query home mobile network 460 to determine whether to accept the registration request. Although roaming mobile network 440 may have previously rejected terminal device 102's registration requests, roaming mobile network 440 may now accept the registration request. This can happen, for example, because the user enabled roaming on terminal device 102 since the last registration request in stage 540. Accordingly, home mobile network 460 may permit terminal device 102 to roam on roaming mobile network 440. Home mobile network 460 may therefore send terminal device 102's subscription information to roaming mobile network 440 in stage 518. Roaming mobile network 440 may then accept the registration request and send a registration accept to terminal device 102 in stage 520.

Conversely, roaming mobile network 440 may again reject terminal device 102. In that case, controller 306 may keep roaming mobile network 440 on the forbidden list and, for example, may not re-attempt to register on roaming mobile network 440 until a long duration time expires, until terminal device 102 restarts, or until a user manually selects roaming mobile network 440.

Thus, by re-attempting registration on a forbidden mobile network after a periodic mobile network scan, terminal device 102 may make one more attempt to register on the forbidden mobile network. As described above, terminal device 102 may do this for forbidden mobile networks that are ranked highly in the operator list (e.g., the highest ranked, or one of the highest ranked). Because the issue that caused the earlier registration rejections may have been resolved, terminal device 102 may be able to successfully register on the forbidden mobile network with this initial attempt.

FIG. 6 describes an exemplary real-world use case with flow chart 600. As shown in FIG. 6, terminal device 102 may subscribe to a home mobile network based in Germany. When the user visits a different country, such as the UK, in stage 604, terminal device 102 may use roaming for mobile service. SIM 308 may store a list of mobile networks that ranks mobile networks in the UK for roaming. In this example, the list may rank VPLMN-2 first and VPLMN-3 second.

When the user arrives in the UK, they may activate terminal device 102, such as by turning on terminal device 102 or by disabling airplane mode. Terminal device 102 may then attempt to connect to a network. To do so, terminal device 102 may scan for mobile networks, determine which country terminal device 102 is in, and detect which mobile networks are available in stage 606. Terminal device 102 may first detect VPLMN-1, which is not ranked in the list in this example.

Terminal device 102 may then attempt to register on VPLMN-1 in stage 608. This registration attempt may fail. This can happen, for example, if the user has not enabled terminal device 102 for international roaming. In that case, VPLMN-1 may specify a rejection cause such as 3GPP Cause #11 ("PLMN not allowed"). Terminal device 102 may then add VPLMN-1 to the forbidden list.

Terminal device 102 may then scan for other mobile networks in stage 610. During that scan, terminal device 102 may detect VPLMN-2, which is the highest ranked mobile network in the list. Terminal device 102 may then successfully register on VPLMN-2 in stage 612. As part of the registration, terminal device 102's home mobile network may use steering of roaming to provide an operator list of mobile networks to terminal device 102. Terminal device 102 may receive that operator list in stage 614. For example, the home mobile network may send the operator list to VPLMN-2, which may then forward the operator list to terminal device 102.

As FIG. 6 shows, the operator list may be different from the list, and may rank VPLMN-1 first, VPLMN-2 second, and VPLMN-3 third. This means the highest-ranked mobile network, VPLMN-1, is currently on terminal device 102's forbidden list. However, instead of ignoring VPLMN-1, terminal device 102 may overrule its forbidden list and attempt to register on VPLMN-1. For instance, terminal device 102 may determine whether there are any mobile networks ranked higher than the current roaming mobile network (VPLMN-2) in the operator list, including forbidden mobile networks. Terminal device 102 may determine that VPLMN-1 is ranked higher than VPLMN-2, and so may attempt to register on VPLMN-1 in stage 616.

If the user has enabled international roaming since stage 608, the registration on VPLMN-1 may be successful in stage 616. While this is one scenario where the second registration attempt on VPLMN-1 is successful, there may be other scenarios where this occurs. In any case, with this technique terminal device 102 may be able to register on the highest-ranked mobile network on the operator list, even if that mobile network was previously on the forbidden list.

If registration on VPLMN-2 fails in stage 616, terminal device 102 may either i) keep VPLMN-1 on the forbidden list and not attempt another registration (until a long duration timer expiry, device restart, or manual user selection), or ii) attempt registration on VPLMN-1 only one additional time after a periodic mobile network scan timer expires. As previously explained, aspects using the periodic mobile network scan timer may trigger mobile network scans whenever terminal device 102 is not registered on the highest-ranked mobile network. Accordingly, because terminal device 102 will remain on VPLMN-2, terminal device 102 may trigger a periodic mobile network scan to check if VPLMN-1 is still available. If so, terminal device 102 may attempt one more registration on VPLMN-1. In other aspects, terminal device 102 may attempt to register on VPLMN-1 for a limited number of subsequent periodic mobile network scans (e.g., more than one). For instance, terminal device 102 may attempt to register on VPLMN-1 for only two more periodic mobile network scans, only three more periodic mobile network scans, or another limited number of periodic mobile network scans.

Various examples above explained that the home mobile network may send the operator list to the terminal device (via the roaming mobile network) when the roaming mobile network accepts the registration request. In other examples, the home mobile network may send the operator list to the terminal device (via the roaming mobile network) when the roaming mobile network accepts the registration request. For instance, referring back to FIG. 4, if roaming mobile network 450 rejects terminal device 102 in stages 418-424, home mobile network 460 may still send the operator list to roaming mobile network 450, and roaming mobile network 450 may still forward the operator list to terminal device 102 (even though terminal device 102 was rejected).

Various examples above explained that controller 306 may add or remove mobile networks from a forbidden mobile network list (e.g., list of forbidden PLMNs or a list of forbidden PLMNs for GPRS/EPS services) stored on SIM 308. In some aspects, controller 306 may update the data on SIM 308, such as by updating the data to remove from the forbidden list mobile networks that are ranked highly in the operator list. In other aspects, controller 306 may not update the actual data on SIM 308, but may still re-attempt registration on forbidden mobile networks that are ranked highly in the operator list.

FIG. 7 shows exemplary method 700 of performing wireless communications at a wireless device according to some aspects. As shown in FIG. 7, method 700 includes receiving a registration rejection from a first roaming mobile network while roaming (stage 702), adding the first roaming mobile network to a list of forbidden mobile networks (stage 704), registering with a second roaming mobile network and receiving an operator list of mobile networks from a home mobile network (stage 706), and attempting to register with the first roaming mobile network based on a ranking of mobile networks in the operator list (stage 708).

Some aspects of this disclosure refer to the 3GPP's steering of roaming feature. The methods and devices of this disclosure can also be used for other standards that use similar features, such as any standard that allows the home mobile network to provide a list of mobile networks to a roaming terminal device. Aspects of this disclosure are therefore not limited to 3GPP's steering of roaming.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples relate to further aspects of this disclosure:

Example 1 is a method of performing wireless communications at a wireless device, the method including receiving a registration rejection from a first roaming mobile network while roaming, adding the first roaming mobile network to a list of forbidden mobile networks, registering with a second roaming mobile network and receiving an operator list of mobile networks from a home mobile network, and attempting to register with the first roaming mobile network based on a ranking of mobile networks in the operator list.

In Example 2, the subject matter of Example 1 can optionally include wherein attempting to register with the first roaming mobile network based on the ranking of mobile networks in the operator list includes attempting to register with the first roaming mobile network if the operator list of mobile networks ranks the first roaming mobile network with a higher priority than the second roaming mobile network.

In Example 3, the subject matter of Example 1 or 2 can optionally further include before receiving the registration rejection from the first roaming mobile network, performing a mobile network scan to detect the first roaming mobile network.

In Example 4, the subject matter of Example 3 can optionally further include receiving a system information message from the first roaming mobile network to obtain a mobile country code that indicates which country the first roaming mobile network is in.

In Example 5, the subject matter of Example 3 or 4 can optionally further include triggering the mobile network scan after a user powers on the wireless device or disables airplane mode on the wireless device.

In Example 6, the subject matter of any one of Examples 1 to 4 can optionally further include before receiving the registration rejection from the first roaming mobile network, transmitting to the first roaming mobile network a registration request.

In Example 7, the subject matter of Example 1 can optionally further include before receiving the registration rejection from the first roaming mobile network, performing a mobile network scan to detect a plurality of available mobile networks, and selecting, from the plurality of available mobile networks, the first roaming mobile network based on a list of mobile networks that ranks roaming mobile networks by priority for roaming.

In Example 8, the subject matter of Example 7 can optionally include wherein selecting from the plurality of available mobile networks the first roaming mobile network based on a list of mobile networks includes determining that the first roaming mobile network is ranked higher than the rest of the plurality of available mobile networks in the list of mobile networks.

In Example 9, the subject matter of any one of Examples 1 to 8 can optionally include wherein receiving the operator list of mobile networks from the home mobile network includes receiving the operator list of mobile networks from the home mobile network via forwarding by the second roaming mobile network.

In Example 10, the subject matter of any one of Examples 1 to 9 can optionally include wherein the operator list of mobile networks ranks mobile networks by priority for roaming.

In Example 11, the subject matter of any one of Examples 1 to 10 can optionally include wherein attempting to register with the first roaming mobile network includes transmitting a registration request to the first roaming mobile network.

In Example 12, the subject matter of any one of Examples 1 to 11 can optionally further include receiving a registration accept from the first roaming mobile network, and transmitting or receiving data on the first roaming mobile network while roaming.

In Example 13, the subject matter of any one of Examples 1 to 12 can optionally include wherein attempting to register with the first roaming mobile network based on the ranking of mobile networks in the operator list includes if the operator list of mobile networks ranks the first roaming mobile network with a lower priority than the second roaming mobile network, remaining registered on the second roaming mobile network.

In Example 14, the subject matter of any one of Examples 1 to 13 can optionally further include after receiving the operator list, comparing the second roaming mobile network to the operator list to determine whether any mobile networks are ranked higher than the second roaming mobile network.

In Example 15, the subject matter of any one of Examples 1 to 14 can optionally further include after attempting to register with the first roaming mobile network, receiving a registration rejection from the first roaming mobile network, starting a periodic mobile network scan timer, and after the periodic mobile network scan timer expires, attempting again to register with the first roaming mobile network.

In Example 16, the subject matter of any one of Examples 1 to 15 can optionally further include storing the list of forbidden mobile networks on a subscriber identity module (SIM) card.

In Example 17, the subject matter of any one of Examples 1 to 16 can optionally further include retrieving and maintaining the list of forbidden mobile networks with cloud-based storage.

In Example 18, the subject matter of any one of Examples 1 to 17 can optionally include wherein the operator list of mobile networks is an operator list for steering of roaming.

Example 19 is a wireless device including a digital receiver and a digital transmitter, and a controller configured to control the digital receiver to receive signals and the digital transmitter to transmit signals, and further configured to receive a registration rejection from a first roaming mobile network while roaming, add the first roaming mobile network to a list of forbidden mobile networks, register with a second roaming mobile network and receiving an operator list of mobile networks from a home mobile network, and attempt to register with the first roaming mobile network based on a ranking of mobile networks in the operator list.

In Example 20, the subject matter of Example 19 can optionally include wherein the controller is configured to attempt to register with the first roaming mobile network if the operator list of mobile networks ranks the first roaming mobile network with a higher priority than the second roaming mobile network.

In Example 21, the subject matter of Example 19 or 20 can optionally further include a radio frequency transceiver and one or more antennas, wherein the digital receiver is configured to receive signals via the radio frequency transceiver and the one or more antennas and wherein the digital transmitter is configured to transmit signals via the radio frequency transceiver and the one or more antennas.

In Example 22, the subject matter of any one of Examples 19 to 21 can optionally include wherein the digital receiver is a physical layer receive chain and the digital transmitter is a physical layer transmit chain.

In Example 23, the subject matter of any one of Examples 19 to 22 can optionally include wherein the controller is further configured to before receiving the registration rejection from the first roaming mobile network, perform a mobile network scan to detect the first roaming mobile network.

In Example 24, the subject matter of Example 23 can optionally include wherein the controller is further configured to receive a system information message from the first roaming mobile network to obtain a mobile country code that indicates which country the first roaming mobile network is in.

In Example 25, the subject matter of Example 23 or 24 can optionally include wherein the controller is further configured to trigger the mobile network scan after a user powers on the wireless device or disables airplane mode on the wireless device.

In Example 26, the subject matter of any one of Examples 19 to 25 can optionally include wherein the controller is further configured to before receiving the registration rejection from the first roaming mobile network, transmit to the first roaming mobile network a registration request.

In Example 27, the subject matter of any one of Examples 19 to 22 can optionally include wherein the controller is further configured to before receiving the registration rejection from the first roaming mobile network, perform a mobile network scan to detect a plurality of available mobile networks, and select, from the plurality of available mobile networks, the first roaming mobile network based on a list of mobile networks that ranks roaming mobile networks by priority for roaming.

In Example 28, the subject matter of Example 27 can optionally include wherein the controller is configured to select from the plurality of available mobile networks the first roaming mobile network based on a list of mobile networks by determining that the first roaming mobile network is ranked higher than the rest of the plurality of available mobile networks in the list of mobile networks.

In Example 29, the subject matter of any one of Examples 19 to 28 can optionally include wherein the controller is configured to receive the operator list of mobile networks from the home mobile network by receiving the operator list of mobile networks from the home mobile network via forwarding by the second roaming mobile network.

In Example 30, the subject matter of any one of Examples 19 to 29 can optionally include wherein the operator list of mobile networks ranks mobile networks by priority for roaming.

In Example 31, the subject matter of any one of Examples 19 to 30 can optionally include wherein the controller is configured to attempt to register with the first roaming mobile network by transmitting a registration request to the first roaming mobile network.

In Example 32, the subject matter of any one of Examples 19 to 31 can optionally include wherein the controller is further configured to after attempting to register on the first roaming mobile network, receive a registration accept from the first roaming mobile network, and transmit or receive data on the first roaming mobile network while roaming.

In Example 33, the subject matter of any one of Examples 19 to 32 can optionally include wherein the controller is further configured to if the operator list of mobile networks ranks the first roaming mobile network with a lower priority than the second roaming mobile network, remain registered on the second roaming mobile network.

In Example 34, the subject matter of any one of Examples 19 to 33 can optionally include wherein controller is further configured to after receiving the operator list, compare the second roaming mobile network to the operator list to determine whether any mobile networks are ranked higher than the second roaming mobile network.

In Example 35, the subject matter of any one of Examples 19 to 34 can optionally include wherein the controller is further configured to after attempting to register with the first roaming mobile network, receive a registration rejection from the first roaming mobile network, start a periodic mobile network scan timer, and after the periodic mobile network scan timer expires, attempt again to register with the first roaming mobile network.

In Example 36, the subject matter of any one of Examples Examples 19 to can optionally include, wherein the controller is configured to access the list of forbidden mobile networks on a subscriber identity module (SIM) card.

In Example 37, the subject matter of any one of Examples 19 to 35 can optionally include wherein the controller is configured to access the list of forbidden mobile networks with cloud-based storage.

In Example 38, the subject matter of any one of Examples 19 to 37 can optionally include wherein the operator list of mobile networks is an operator list for steering of roaming.

Example 39 is a wireless device including a radio frequency transceiver and one or more antennas, one or more processors configured to transmit and receive signals via the radio frequency transceiver and the one or more antennas, the one or more processors further configured to receive a registration rejection from a first roaming mobile network while roaming, add the first roaming mobile network to a list of forbidden mobile networks, register with a second roaming mobile network and receive an operator list of mobile networks from a home mobile network, and attempt to register with the first roaming mobile network based on a ranking of mobile networks in the operator list.

In Example 40, the subject matter of any one of Examples the one or can optionally include processors are configured to attempt to register with the first roaming mobile network if the operator list of mobile networks ranks the first roaming mobile network with a higher priority than the second roaming mobile network.

In Example 41, the subject matter of Example 39 or 40 can optionally include wherein the one or more processors are further configured to before receiving the registration rejection from the first roaming mobile network, perform a mobile network scan to detect the first roaming mobile network.

In Example 42, the subject matter of Example 41 can optionally include wherein the one or more processors are further configured to receive a system information message from the first roaming mobile network to obtain a mobile country code that indicates which country the first roaming mobile network is in.

In Example 43, the subject matter of Example 41 or 42 can optionally include wherein the one or more processors are further configured to trigger the mobile network scan after a user powers on the wireless device or disables airplane mode on the wireless device.

In Example 44, the subject matter of any one of Examples 39 to 43 can optionally include wherein the one or more processors are further configured to before receiving the registration rejection from the first roaming mobile network, transmit to the first roaming mobile network a registration request.

In Example 45, the subject matter of Example 39 can optionally include wherein the one or more processors are further configured to before receiving the registration rejection from the first roaming mobile network, perform a mobile network scan to detect a plurality of available mobile networks, and select, from the plurality of available mobile networks, the first roaming mobile network based on a list of mobile networks that ranks roaming mobile networks by priority for roaming.

In Example 46, the subject matter of Example 45 can optionally include wherein the one or more processors are configured to select from the plurality of available mobile networks the first roaming mobile network based on a list of mobile networks by determining that the first roaming mobile network is ranked higher than the rest of the plurality of available mobile networks in the list of mobile networks.

In Example 47, the subject matter of any one of Examples 39 to 46 can optionally include wherein the one or more processors are configured to receive the operator list of mobile networks from the home mobile network by receiving the operator list of mobile networks from the home mobile network via forwarding by the second roaming mobile network.

In Example 48, the subject matter of any one of Examples 39 to 47 can optionally include wherein the operator list of mobile networks ranks mobile networks by priority for roaming.

In Example 49, the subject matter of any one of Examples 39 to 48 can optionally include wherein the one or more processors are configured to attempt to register with the first roaming mobile network by transmitting a registration request to the first roaming mobile network.

In Example 50, the subject matter of any one of Examples 39 to 49 can optionally include wherein the one or more processors are further configured to after attempting to register on the first roaming mobile network, receive a registration accept from the first roaming mobile network, and transmit or receive data on the first roaming mobile network while roaming.

In Example 51, the subject matter of any one of Examples 39 to 50 can optionally include wherein the one or more processors are further configured to if the operator list of mobile networks ranks the first roaming mobile network with a lower priority than the second roaming mobile network, remain registered on the second roaming mobile network.

In Example 52, the subject matter of any one of Examples 39 to 51 can optionally include wherein one or more processors are further configured to after receiving the operator list, compare the second roaming mobile network to the operator list to determine whether any mobile networks are ranked higher than the second roaming mobile network.

In Example 53, the subject matter of any one of Examples 39 to 52 can optionally include wherein the one or more processors are further configured to after attempting to register with the first roaming mobile network, receive a registration rejection from the first roaming mobile network, start a periodic mobile network scan timer, and after the periodic mobile network scan timer expires, attempt again to register with the first roaming mobile network.

In Example 54, the subject matter of any one of Examples Examples 39 to can optionally include, wherein the one or more processors are configured to access the list of forbidden mobile networks on a subscriber identity module (SIM) card.

In Example 55, the subject matter of any one of Examples 39 to 53 can optionally include wherein the one or more processors are configured to access the list of forbidden mobile networks with cloud-based storage.

In Example 56, the subject matter of any one of Examples 39 to 55 can optionally include wherein the operator list of mobile networks is an operator list for steering of roaming.

Example 57 is a non-transitory computer readable medium storing instructions that, when executed by one or more processors of a wireless device, cause the wireless device to perform the method of any one of Examples 1 to 18.

Example 58 is a wireless device including one or more processors, and a memory storing instructions that, when executed by the one or more processors, cause the wireless device to perform the method of any one of Examples 1 to 18.

Example 59 is a wireless device including means for receiving a registration rejection from a first roaming mobile network while roaming, means for adding the first roaming mobile network to a list of forbidden mobile networks, means for registering with a second roaming mobile network and receiving an operator list of mobile networks from a home mobile network, and means for attempting to register with the first roaming mobile network based on a ranking of mobile networks in the operator list.

In Example 60, the subject matter of Example 59 can optionally further include means for performing the method of any one of Examples 3 to 18.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless device comprising:
 a digital receiver and a digital transmitter; and
 a controller configured to control the digital receiver to receive signals and the digital transmitter to transmit signals, and further configured to:
 receive a registration rejection from a first roaming mobile network while roaming;
 add the first roaming mobile network to a list of forbidden mobile networks;
 register with a second roaming mobile network and receive an operator list of mobile networks from a home mobile network; and
 attempt to register with the first roaming mobile network based on a ranking of mobile networks in the operator list.

2. The wireless device of claim 1, wherein the controller is configured to attempt to register with the first roaming mobile network if the operator list of mobile networks ranks the first roaming mobile network with a higher priority than the second roaming mobile network.

3. The wireless device of claim 1, further comprising a radio frequency transceiver and one or more antennas, wherein the digital receiver is configured to receive signals via the radio frequency transceiver and the one or more antennas and wherein the digital transmitter is configured to transmit signals via the radio frequency transceiver and the one or more antennas.

4. The wireless device of claim 1, wherein the controller is further configured to:
 before receiving the registration rejection from the first roaming mobile network, perform a mobile network scan to detect the first roaming mobile network.

5. The wireless device of claim 4, wherein the controller is further configured to:
 trigger the mobile network scan after a user powers on the wireless device or disables airplane mode on the wireless device.

6. The wireless device of claim 1, wherein the controller is further configured to:
 before receiving the registration rejection from the first roaming mobile network, perform a mobile network scan to detect a plurality of available mobile networks; and
 select, from the plurality of available mobile networks, the first roaming mobile network based on a list of mobile networks that ranks roaming mobile networks by priority for roaming.

7. The wireless device of claim 6, wherein the controller is configured to select from the plurality of available mobile networks the first roaming mobile network based on a list of mobile networks by:
    determining that the first roaming mobile network is ranked higher than the rest of the plurality of available mobile networks in the list of mobile networks.

8. The wireless device of claim 1, wherein the controller is configured to receive the operator list of mobile networks from the home mobile network by:
    receiving the operator list of mobile networks from the home mobile network via forwarding by the second roaming mobile network.

9. The wireless device of claim 1, wherein the controller is further configured to:
    after attempting to register on the first roaming mobile network, receive a registration accept from the first roaming mobile network; and
    transmit or receive data on the first roaming mobile network while roaming.

10. The wireless device of claim 1, wherein the controller is further configured to:
    if the operator list of mobile networks ranks the first roaming mobile network with a lower priority than the second roaming mobile network, remain registered on the second roaming mobile network.

11. The wireless device of claim 1, wherein controller is further configured to:
    after receiving the operator list, compare the second roaming mobile network to the operator list to determine whether the operator list ranks any mobile networks higher than the second roaming mobile network.

12. The wireless device of claim 1, wherein the controller is further configured to:
    after attempting to register with the first roaming mobile network, receive a registration rejection from the first roaming mobile network;
    start a periodic mobile network scan timer; and
    after the periodic mobile network scan timer expires, attempt again to register with the first roaming mobile network.

13. A method of performing wireless communications at a wireless device, the method comprising:
    receiving a registration rejection from a first roaming mobile network while roaming;
    adding the first roaming mobile network to a list of forbidden mobile networks;
    registering with a second roaming mobile network and receiving an operator list of mobile networks from a home mobile network; and
    attempting to register with the first roaming mobile network based on a ranking of mobile networks in the operator list.

14. The method of claim 13, wherein attempting to register with the first roaming mobile network based on the ranking of mobile networks in the operator list comprises:
    attempting to register with the first roaming mobile network if the operator list of mobile networks ranks the first roaming mobile network with a higher priority than the second roaming mobile network.

15. The method of claim 13, further comprising:
    before receiving the registration rejection from the first roaming mobile network, performing a mobile network scan to detect a plurality of available mobile networks; and
    selecting, from the plurality of available mobile networks, the first roaming mobile network based on a list of mobile networks that ranks roaming mobile networks by priority for roaming.

16. The method of claim 13, wherein receiving the operator list of mobile networks from the home mobile network comprises:
    receiving the operator list of mobile networks from the home mobile network via forwarding by the second roaming mobile network.

17. A wireless device comprising:
    a radio frequency transceiver and one or more antennas;
    one or more processors configured to transmit and receive signals via the radio frequency transceiver and the one or more antennas, the one or more processors further configured to:
    receive a registration rejection from a first roaming mobile network while roaming;
    add the first roaming mobile network to a list of forbidden mobile networks;
    register with a second roaming mobile network and receive an operator list of mobile networks from a home mobile network; and
    attempt to register with the first roaming mobile network based on a ranking of mobile networks in the operator list.

18. The wireless device of claim 17, wherein the one or more processors are configured to attempt to register with the first roaming mobile network if the operator list of mobile networks ranks the first roaming mobile network with a higher priority than the second roaming mobile network.

19. The wireless device of claim 17, wherein the one or more processors are configured to receive the operator list of mobile networks from the home mobile network by:
    receiving the operator list of mobile networks from the home mobile network via forwarding by the second roaming mobile network.

20. The wireless device of claim 17, wherein the one or more processors are further configured to:
    after attempting to register on the first roaming mobile network, receive a registration accept from the first roaming mobile network; and
    transmit or receive data on the first roaming mobile network while roaming.

* * * * *